US 6,774,348 B2

(12) United States Patent
Guenter et al.

(10) Patent No.: US 6,774,348 B2
(45) Date of Patent: Aug. 10, 2004

(54) METHOD AND APPARATUS FOR MONITORING THE POWER OF A MULTI-WAVELENGTH OPTICAL SIGNAL

(75) Inventors: James K. Guenter, Garland, TX (US); Jimmy A. Tatum, Plano, TX (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/163,440

(22) Filed: Jun. 4, 2002

(65) Prior Publication Data

US 2003/0222208 A1 Dec. 4, 2003

(51) Int. Cl.[7] .................................................. G01J 1/32
(52) U.S. Cl. ...................................... 250/205; 257/436
(58) Field of Search ......................... 250/205, 214 R, 250/214.1, 214 LS, 227.21, 227.23; 385/16, 17, 2, 6, 8, 9; 257/21, 22, 431–436

(56) References Cited

U.S. PATENT DOCUMENTS

| | | | |
|---|---|---|---|
| 4,857,727 A | 8/1989 | Lenz et al. | |
| 5,650,635 A | 7/1997 | Razeghi et al. | |
| 5,770,868 A | 6/1998 | Gill et al. | |
| 5,796,479 A | 8/1998 | Derickson et al. | |
| 6,445,839 B1 * | 9/2002 | Miller | 385/17 |

FOREIGN PATENT DOCUMENTS

| | | |
|---|---|---|
| EP | 1089477 A2 | 4/2001 |
| EP | 1130712 A2 | 9/2001 |
| JP | 11030349 | 2/1999 |
| JP | 11135436 | 5/1999 |

OTHER PUBLICATIONS

Chen et al., "Application of Integrated Active Filters in Multichannel Optical Communication Systems", ECOC 97 Conference Publication No. 448, pp. 235–238, Sep. 22–25, 1997.

Chen et al., "WDM Channel Monitoring and Single Power Control/Equalization Using Integrated Tunable Active Filters", Conference paper: 1997 Digest of the IEEE/LEOS Summer Topical Meetings, pp. 48–49, Montreal Quebec, Canada conference Aug. 11–15, 1997.

Kishimoto et al., "Anomalous surface absorption band at 1.2 eV in $Si_{1-x}Ge_x$ alloy–based structures", Thin Solid Films No. 369, pp. 423–425, 2000. Month unknown.

Lee et al., "Simultaneous Optical Monitoring and Fiber Supervising for WDM Networks Using an OTDR Combined With Concatenated Fiber Gratings", IEEE Photonics Technology Letters vol. 13 No. 09, pp. 1026–1028, Sep. 2001.

Li, Gabriel Siu–hung, "Wavelength–Selective Detectors for Fiber–Optic Communications (Wide Area Networks, Local Area Networks, Multiple Wavelength Detector Array)", UMI No. 9924580, pp. 1–120, Dec. 1998.

(List continued on next page.)

Primary Examiner—Que T. Le
(74) Attorney, Agent, or Firm—Andrew A. Abeyta (57) ABSTRACT

Methods and apparatus for monitoring the power level of a multi-wavelength optical signal are provided. Also provided are methods and apparatus for adjusting the power level of selected optical emitters to compensate for the changes in power levels.

34 Claims, 8 Drawing Sheets

OTHER PUBLICATIONS

Otsuka et al., "A High–Performance Optical Spectrum Monitor with High–Speed Measuring Time of WDM Optical Networks", ECOC 97 Conference Publication No. 448, pp. 147–150, Sep. 22–25, 1997.

Rossi et al., "Optical Performance Monitoring in Reconfigurable WDM Optical Networks Using Subcarrier Multiplexing", Journal of Lightwave Technology, vol. 18 No. 12, pp. 1639–1648, Dec. 2000.

Sun et al., "Fault Identification for Amplified WDM Optical Networks", 22$^{nd}$ European conference on Optical Communications—ECOC'96, pp. 31–34, Oslo, Norway, Sep. 15–19, 1996.

Temkin et al., "Photocurrent response of Gain/As/InP multiple quantum well detectors grown by gas Source molecular beam epitaxy", Appl. Phys. Lett. 47(9), pp. 978–980, Nov. 1, 1985.

Heismann, et al., "Signal Tracking and Performance Monitoring In Multi–Wavelength Optical Networks," 22nd European Conference on Optical Communication—ECOC '96, paper WeB.2.2, pp. 3.47–3.50, (1996). Month unknown.

Sharp, "PD150/PD151", Optoelectronics Data Book, pp. 137–141, 1988/89. Month unknown.

* cited by examiner

METHOD AND APPARATUS FOR MONITORING THE POWER OF A MULTI-WAVELENGTH OPTICAL SIGNAL

BACKGROUND OF THE INVENTION

This invention relates to the field of optical systems, and more particularly to methods and apparatus for monitoring the power of a multi-wavelength optical signal.

Various forms of optoelectronic devices have been developed and have found widespread use including, for example, semiconductor lasers, semiconductor photodiodes, semiconductor photo detectors, etc. For some of these applications, an optoelectronic emitter such as a semiconductor laser is coupled to an optoelectronic detector (e.g., photodiode or Resonant Cavity Photo Detector) through a fiber optic link or even free space. This configuration can provide a high-speed communication path, which, for many applications, can be extremely beneficial.

The increased use of all-optical fiber networks as backbones for global communication systems has been based in large part on the extremely wide optical transmission bandwidth provided by optical fiber. This has led to an increased demand for the practical utilization of the optical fiber bandwidth, which can provide, for example, increase communication system user capacity. In the prevailing manner for exploiting optical fiber bandwidth, wavelength-division multiplexing (WDM) and wavelength-division demultiplexing (WDD) techniques are used to enable the simultaneous transmission of multiple independent optical data streams, each at a distinct wavelength, on a single optical fiber, with wavelength-selective WDM and WDD control provided for coupling of the multiple data streams with the optical fiber on a wavelength-specific basis. With this capability, a single optical fiber can be configured to simultaneously transmit several optical data streams, e.g., ten optical data streams, that each might not exceed, say, 10 Gb/s, but that together represent an aggregate optical fiber transmission bandwidth of more than, say, 100 Gb/s.

In order to increase the aggregate transmission bandwidth of an optical fiber, it is generally preferred that the wavelength spacing of simultaneously transmitted optical data streams, or optical data "channels," be closely packed to accommodate a larger number of channels. In other words, the difference in wavelength between two adjacent channels is preferably minimized.

In addition, in WDM communications systems as well as in many other applications, it is often desirable to monitor the power of each data channel. The power of each data channel may vary for a variety of reasons including, for example, changing operating conditions such as operating voltage, operating temperature, device degradation, etc. If the power of one or more of the data channels falls outside of a desired range, the reliability of the communications link can significantly degrade. In some systems, it is possible to provide a separate detector for each data channel. However, this is not always possible, and in many cases, can add significant cost to the system.

SUMMARY OF THE INVENTION

The present invention provides methods and apparatus for monitoring the power level of a multi-wavelength optical signal. Also provided are methods and apparatus for adjusting the power level of selected optical emitters to compensate for the changes in power levels.

In one illustrative embodiment of the present invention, a detector is used to detect two or more wavelengths of light, and to provide an indication of the power level of each wavelength of light in a multi-wavelength optical signal. The detector may include, for example, a first absorbing layer, a second absorbing layer situated below the first absorbing layer, and an intermediate layer situated between the first absorbing layer and the second absorbing layer. In some embodiments, the first absorbing layer and the second absorbing layer are a first conductivity type, and the intermediate layer is a second conductivity type. In this configuration, a first PN junction may be formed between the first absorbing layer and the intermediate layer, and a second PN junction may be formed between the second absorbing layer and the intermediate layer.

The detector may receive a multi-wavelength optical signal. The multi-wavelength optical signal may be provided by, for example, two or more optoelectronic emitters, such as semiconductor lasers, semiconductor light emitting diodes, etc., each providing a different wavelength of light. The first absorbing layer may absorb a first portion of a first wavelength of light and a second portion of a second wavelength of light. For example, the first absorbing layer may absorb a majority of the first wavelength of light and a minority of the second wavelength of light. The second absorbing layer, which is preferably situated below the first absorbing layer, may absorb a third portion of the first wavelength of light and a fourth portion of the second wavelength of light. For example, the second absorbing layer may absorb a minority of the first wavelength of light and a majority of the second wavelength of light. The relative portions of light absorbed by the first absorbing layer and the second absorbing layer may be controlled by, for example, the materials and/or thickness used for the first absorbing layer and/or second absorbing layer. In a preferred embodiment, the first absorbing layer and the second absorbing layer are adapted to collectively absorb all or substantially all of the first wavelength of light and the second wavelength of light.

When the power of either the first wavelength of light or the second wavelength of light changes, the relative portions absorbed by the first absorbing layer and the second absorbing layer may also change. For example, if the power level of the first wavelength of light decreases by ten percent, the overall light absorbed by the first absorbing layer may decrease more than the overall light absorbed by the second absorbing layer. In this example, this is because the first absorbing layer absorbs more of the first wavelength of light than the second absorbing layer. Thus, by using a measure of the light absorption in the first absorbing layer and a measure of the light absorption in the second absorbing layer, an indication of the change in the power level of the first wavelength of light and/or the second wavelength of light can be identified.

In some embodiments, a ratio of the measure of the light absorption in the first absorbing layer and the second absorbing layer is used to identify which wavelength of light experienced a power level change. In some embodiments, a sum of the measure of the light absorption in the first absorbing layer and the second absorbing layer may further be used to identify which wavelength of light experienced a power change, and/or if more than one wavelength of light experienced a power change. While only two wavelengths of light are used in this example, it is contemplated that any number of wavelengths may be used.

In another illustrative embodiment of the present invention, an optical transmitter may be provided that includes a first and second electrical input signal. A first modulator may modulate the first electrical input signal with a first electrical power monitor signal to produce a first electrical modulated signal. The first electrical modulated signal may be provided to a corresponding optoelectronic emitter to produce a first optical output signal. The first electrical power monitor signal may operate at a frequency that is substantially less than the frequency or data rate of the first electrical input signal so that the first electrical power monitor signal represents an average power output of the corresponding optoelectronic emitter. In some embodiments, the first modulator may "amplitude" modulate the first electrical input signal with the first electrical power monitor signal, with the amplitude of the first electrical power monitor signal substantially less than the amplitude of the first electrical input signal.

A second modulator may also be provided for modulating the second electrical input signal with a second electrical power monitor signal to produce a second electrical modulated signal. The second electrical modulated signal may be provided to an optoelectronic emitter to produce a second optical output signal. The second electrical power monitor signal may operate at a frequency that is substantially less than the frequency or data rate of the second electrical input signal so that the second electrical power monitor signal represents an average power output of the corresponding optoelectronic emitter. In some embodiments, the second modulator may "amplitude" modulate the second electrical input signal with the second electrical power monitor signal, with the amplitude of the second electrical power monitor signal substantially less than the amplitude of the second electrical input signal.

An optical combiner may combine the first optical output signal and the second optical output signal into a common optical output signal. A detector may then be used to monitor the common optical output signal, and produce a corresponding electrical detection signal. In one embodiment, the detector is a wide band detector.

A filter or the like may be used to frequency separate the first power monitor signal and the second power monitor signal from the electrical detection signal, resulting in a first detected power monitor signal and a second detected power monitor signal. The power of the first optoelectronic emitter and the second optoelectronic emitter may then be adjusted based on one or more characteristics of the first detected power monitor signal and the second detected power monitor signal. For example, the power of the first optoelectronic emitter and the second optoelectronic emitter may be adjusted based on the amplitude of the first detected power monitor signal and the amplitude of the second detected power monitor signal. While only two wavelengths are used in this example, it is contemplated that any number of wavelengths may be used.

Rather than using a broad band detector, it is contemplated that the optical transmitter may include a detector that can help provide an indication of the power level of selected wavelengths of light. For example, if four electrical input signals are provided, two of the electrical input signals may be modulated with a first electrical power monitor signal and the remaining two electrical input signals may be modulated with a second electrical power monitor signal. The four modulated electrical input signals may then be provided to four corresponding optoelectronic emitters to produce four optical output signals. An optical combiner may be used to combine the four optical output signals into a common optical output beam.

The detector may include a first absorbing layer, a second absorbing layer situated below the first absorbing layer, and an intermediate layer situated between the first absorbing layer and the second absorbing layer. The first absorbing layer may absorb a different proportion of the each of the four optical output signals, and the second absorbing layer may absorb the remaining portion of each of the four optical output signals. When the power of any of the four optical output signals changes, the relative portions absorbed by the first absorbing layer and the second absorbing layer may also change. For example, if the power level of a first wavelength of light decreases by ten percent, the overall light absorbed by the first absorbing layer may decrease more than the overall light absorbed by the second absorbing layer, particularly if the first absorbing layer absorbs more of the first wavelength of light.

In one illustrative embodiment, a first electrical input signal and a third electrical input signal are modulated with a first electrical power monitor signal to produce a first electrical modulated signal and a third electrical modulated signal. Likewise, a second electrical input signal and a fourth electrical input signal are modulated with a second electrical power monitor signal to produce a second electrical modulated signal and a fourth electrical modulated signal. The first, second, third and fourth electrical modulated signals are provided to corresponding optoelectronic emitters to produce first, second, third and fourth optical output signals.

A detector having a first absorbing layer and a second absorbing layer receives the first, second, third and fourth optical output signals. The first absorbing layer may absorb a different proportion of the each of the four optical output signals, and the second absorbing layer may absorb substantially the remaining portion of each of the four optical output signals. Using a measure of the light absorption in the first absorbing layer and the second absorbing layer, an indication of change in the power level of the first/fourth optical output signal pair, or the second/third optical output signal pair can be identified.

A filter or the like can be used to separate out the first power monitor signal from the first optical signal and the third optical signal, and the second power monitor signal from the second optical signal and the fourth optical signal. The power of the first optoelectronic emitter may then be adjusted if it is determined that the first optical signal/fourth optical signal pair had an increase or decrease in power level and said first power monitor signal indicates that the first optical signal or the third optical signal had an increase or decrease in power level. Likewise, the power of the second optoelectronic emitter may be adjusted if it is determined that the second optical signal/third optical signal pair had an increase or decrease in power level and the second power monitor signal indicates that said second optical signal or fourth optical signal had an increase or decrease in power level. The power of the third optoelectronic emitter may be adjusted if it is determined that the second optical signal/third optical signal pair had an increase or decrease in power level and said first power monitor signal indicates that the first optical signal or third optical signal had an increase or decrease in power level. Finally, the power of the fourth optoelectronic emitter may be adjusted if it is determined that the first optical signal/fourth optical signal pair had an increase or decrease in power level and said second power monitor signal indicates that said second optical signal or fourth optical signal had an increase or decrease in power level.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
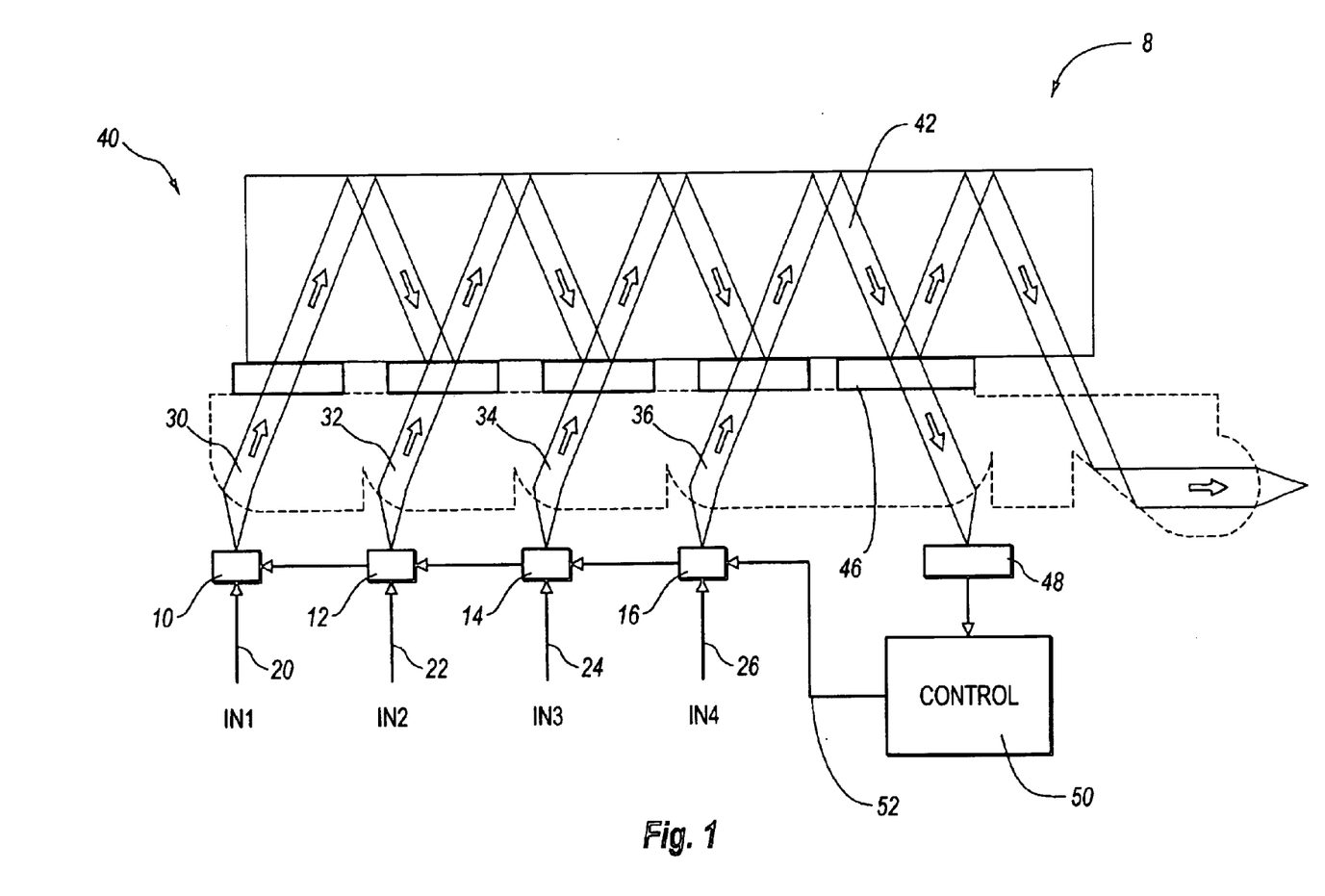
FIG. 1 is a schematic diagram of an optical transmitter system in accordance with one illustrative embodiment of the present invention.

FIG. 1 is a schematic diagram of an optical transmitter system in accordance with one illustrative embodiment of the present invention. The illustrative optical transmitter is generally shown at 8, and includes four optoelectronic emitters 10, 12, 14 and 16. The optoelectronic emitters 10, 12, 14 and 16 maybe any type of optoelectronic emitter including, for example, a conventional laser, a Vertical Cavity Surface Emitting Laser (VCSEL), a light emitting diode (LED), or any other type of optoelectronic emitter. Each optoelectronic emitter 10, 12, 14 and 16 preferably receives an electronic input signal 20, 22, 24 and 26, and provides a corresponding optical output signal 30, 32, 34 and 36, as shown. For WDM and other applications, each optoelectronic emitter 10, 12, 14 and 16 may produce a different wavelength than the other optoelectronic emitters, if desired.

An optical combiner 40 may be used to combine the various optical output signals 30, 32, 34 and 36 into a common optical output signal 42, as shown. In the illustrative embodiment, a partially transmissive plate 46 is used to direct at least a portion of the common optical output signal 42 to a detector 48. The detector 48 is used to sample the common optical output signal 42. In an illustrative embodiment, the detector 48 may include a top detector (D1) and a bottom detector (D2), with each detector absorbing a different proportion of each of the wavelengths of light in the common optical output signal 42.

A control block 50 receives the output signal(s) from the detector 48. In one illustrative embodiment, the controller 50 determines a ratio of the output signals from the top detector (D1) and the bottom detector (D2), and in some cases, an overall magnitude (e.g. sum) of the detector output signals. If one of the optical emitters 10, 12, 14, or 16 degrades or otherwise produces a change in it's output power, the signal ratio (D1/D2) and overall magnitude (e.g. D1+D2) of the output signals from the detectors D1 and D2 may change. By monitoring the signal ratio change, and in some cases the overall magnitude of the detected power, the controller 50 may uniquely identify which of the optical emitters 10, 12, 14, or 16 has produced a change in output power. Once identified, the controller 50 may adjust the current and/or voltage that is provided to the identified optoelectronic emitter 10, 12, 14 or 16 via interface 52 to correct for the detected change in output power.

Figure 2:
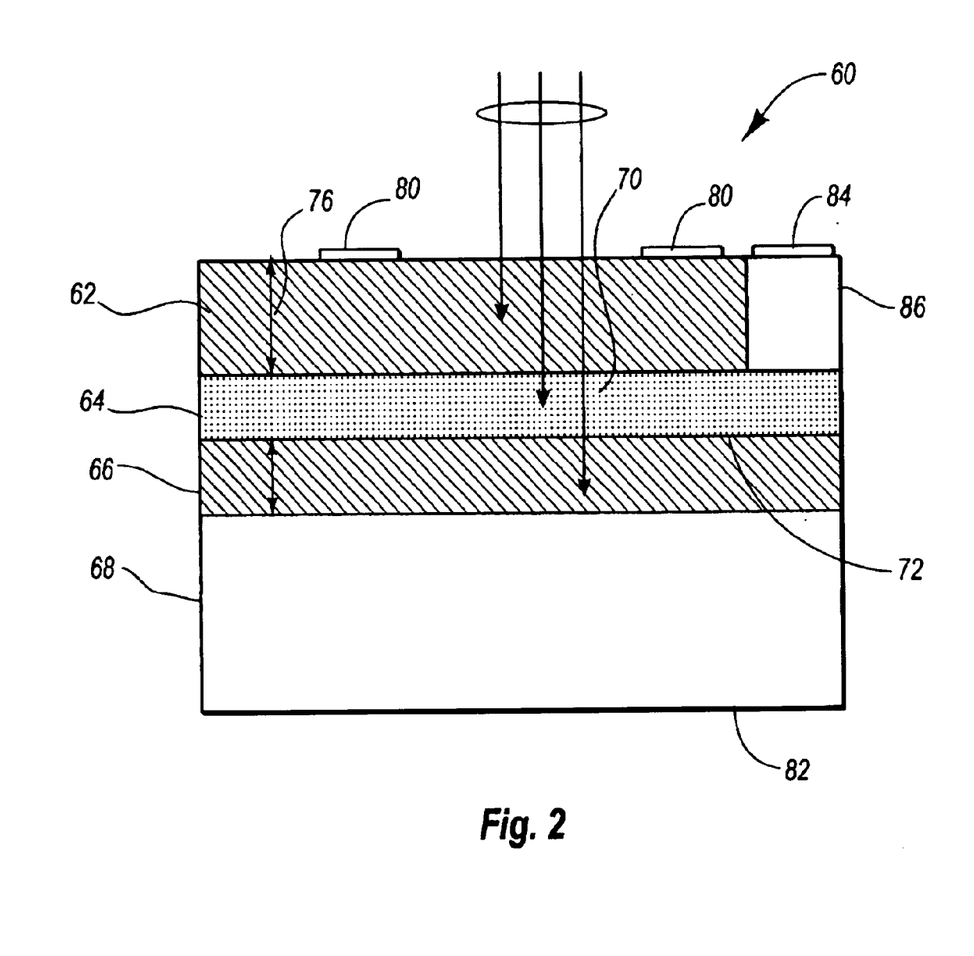
FIG. 2 is a cross-sectional view of an illustrative detector in accordance with the present invention.

FIG. 2 is a cross-sectional view of an illustrative detector in accordance with the present invention. The illustrative detector is generally shown at 60, and includes from top to bottom, a high bandgap P-type layer 62, a high bandgap N-type layer 64, a low bandgap P-type layer 66, followed by a substrate 68. In some embodiments, this forms two back-to-back PN junctions, with the top PN junction 70 forming a top detector (D1) and the bottom PN junction 72 forming a bottom detector (D2). The high bandgap P-type layer 62 may be, for example, $Al_{10}Ga_{90}As$ that is doped P-type. The high bandgap N-type layer 64 may be, for example, $Al_{10}Ga_{90}As$ that is doped to be N-type. The low bandgap P-type layer 66 may be, for example, GaAs that is doped to be P-type. The substrate 68 may also be doped P-type. In some cases, one or more buffer or other intervening layers may also be provided, depending on the circumstances. It is also contemplated that the conductivity types of the various layers may be changed or reversed. For example, the detector may include, from top to bottom, a high bandgap N-type layer 62, a high bandgap P-type layer 64, a low bandgap N-type layer 66, followed by an N-type substrate 68.

In the illustrative embodiment shown, the Al fraction may be used to tune the bandgap of each layer, as desired. For example, the Al fraction of the high bandgap P-type layer 62 may be set so that only wavelengths shorter than a cut-off wavelength are absorbed while longer wavelengths are passed through. The thickness 76 of the high bandgap P-type layer 62 may be adjusted to provide a desired slope in the spectral response curve at the cut-off wavelength. The Al fraction of the high bandgap N-type layer 64 may be similar to that of the high bandgap P-type layer 62. The Al fraction of the low bandgap P-type layer 66 may be lower than the Al fraction of the high bandgap P-type layer 62, so that the cut-off wavelength is higher than the cut-off wavelength of the high bandgap P-type layer 62. In some embodiments, the cut-off wavelength of the low bandgap P-type layer 66 is higher than the longest expected wavelength in the common optical output signal 42.

In another embodiment, the Al fraction of layer 62 may be graded, varying smoothly from a first fraction at the top of 62 to a second fraction at the bottom of 62. This can also have the effect of reducing the slope of response versus wavelength, discussed below in descriptions of FIGS. 5 and 6.

Rather than varying the bandgap energy of the various layers, it is contemplated that the detector 609 may include a number of layers that have the same or similar bandgap energy. For example, the detector 60 may have a P-type layer 62, an N-type layer 64, and a P-type layer 66, all of which are made of a single material such as silicon. In this embodiment, the thickness of each layer may be adjusted so that each layer absorbs a different proportion of the various wavelengths expected in the common optical output signal 42.

Figure 3:
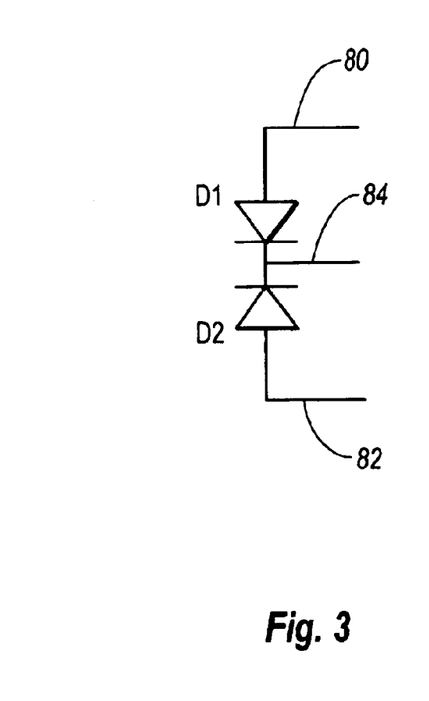
FIG. 3 is a schematic diagram of the illustrative detector of FIG. 2.

In either case, a top contact 80 may make electrical contact to the P-type layer 62. The top contact 80 may be applied to the top surface of the P-type layer 62, as shown. A bottom contact 82 may also be provided to make electrical contact to the P-type layer 66 through the substrate 68. In the illustrative embodiment, the bottom contact 82 is applied to the bottom surface of the substrate 68. In some embodiments, an intermediate contact 84 may also be provided for making an electrical contact to the intermediate N-type layer 64. In the example shown, a heavily N-doped region 86 may be provided to complete the electrical connection between the N-type layer 64 and the intermediate contact 84. Alternatively, a trench could be cut through the P-type layer to afford contact to layer 64. FIG. 3 is a schematic diagram of the illustrative detector of FIG. 2.

Figure 4:
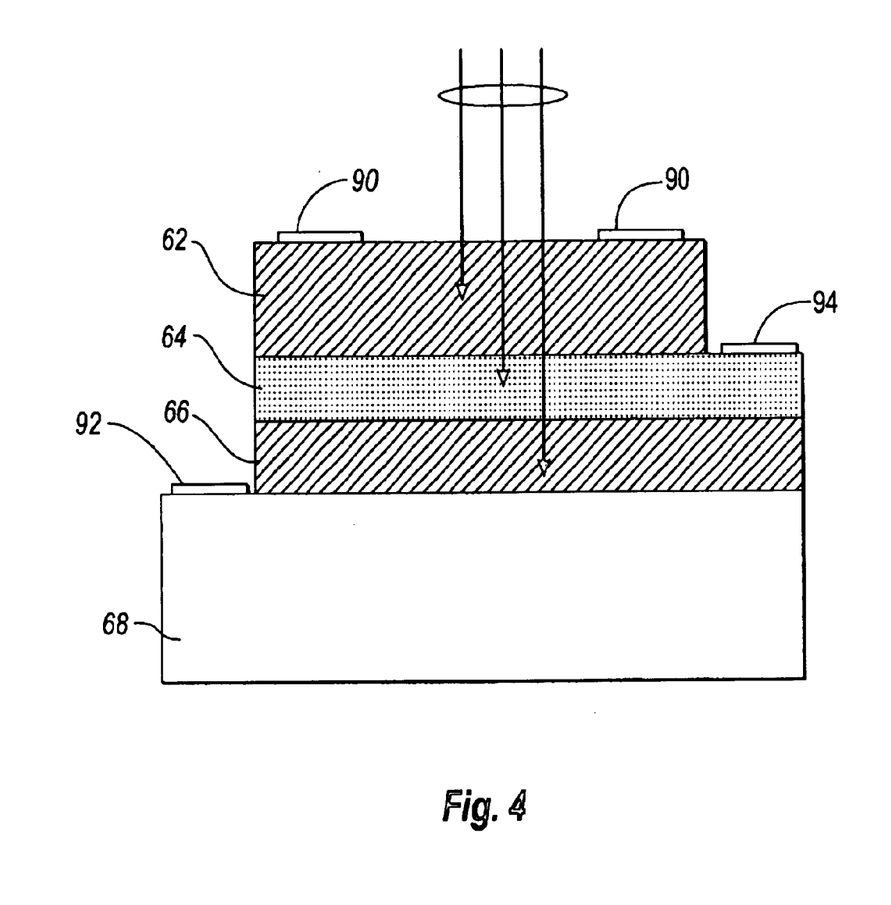
FIG. 4 is a cross-sectional view of another illustrative detector in accordance with the present invention.

FIG. 4 is a cross-sectional view of another illustrative detector in accordance with the present invention. This embodiment is similar to that shown in FIG. 2, but all of the contacts are situated on the top-side of the detector. A top contact 90 is provided on the P-type layer 62 to make electrical contact to the P-type layer 62. To make electrical contact to the P-type layer 66, a trench or mesa is cut through the P-type layer 62, the N-type layer 64, and the P-type layer 66 down to the substrate 68. A contact 92 is then provided on the substrate 68. When the substrate 68 is doped P-type, an electrical connection is made between the contact 92 and the P-type layer 66 through the substrate 68. To make electrical contact with the N-type layer 64, another trench or mesa is cut through the P-type layer 62, as shown. A contact 94 is then provided on the N-type layer 64 as shown. Because all of the contacts 90, 92 and 94 are on the top-side of the detector, the cost associated with packaging the detector may be reduced.

Figure 5:
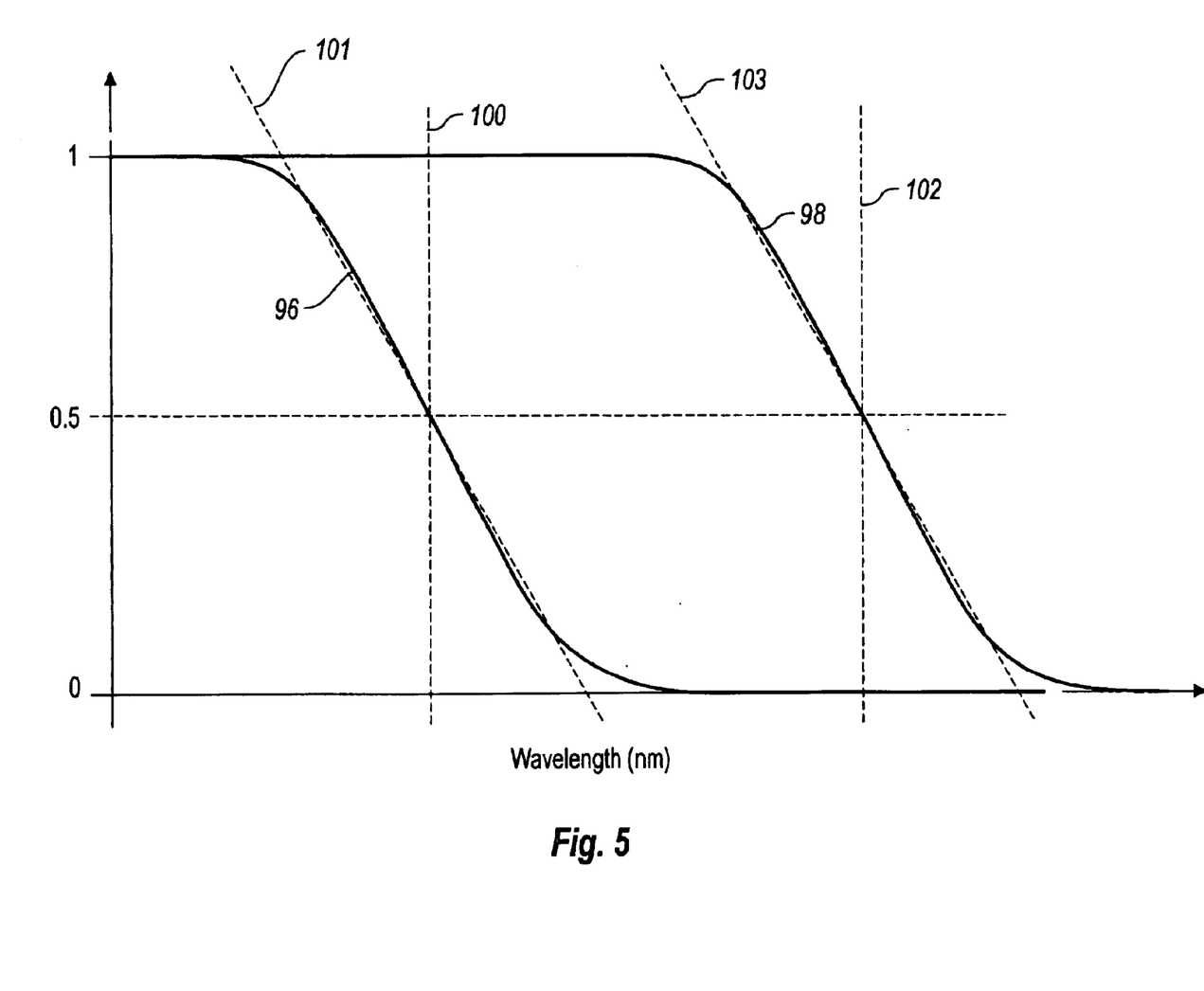
FIG. 5 is a graph showing separate relative spectral responses of the two photodiodes of the detector shown in FIG. 2.

FIG. 5 is a graph showing separate relative spectral responses of the two photo-diodes (D1) and (D2) of the detector shown in FIG. 2. The relative spectral response of the top photo-diode (D1) is shown by curve 96, and the relative spectral response of the bottom photo-diode (D2) is shown by curve 98. As discussed above, the Al fraction in each layer of the detector 60 may be used to tune the bandgap of each layer, and thus the cut-off wavelength of each layer. In the illustrative graph, the Al fraction of the high bandgap P-type layer 62 is set so that only wavelengths shorter than a cut-off wavelength 100 are absorbed while longer wavelengths are passed through. The thickness 76 and/or the grading of the high bandgap P-type layer 62 may be adjusted to provide a desired slope 101 in the spectral response curve 96 at the cut-off wavelength 100.

Likewise, the Al fraction of the low bandgap P-type layer 66 may be lower than the Al fraction of the high bandgap P-type layer 62, so that the cut-off wavelength 102 is higher than the cut-off wavelength 100 of the high bandgap P-type layer 62. In some embodiments, the cut-off wavelength 102 of the low bandgap P-type layer 66 is higher than the longest expected wavelength in the common optical output signal 42. Again, the thickness of the low bandgap P-type layer 66 may be adjusted to provide a desired slope 103 in the spectral response curve 98 at the cut-off wavelength 102.

Figure 6:
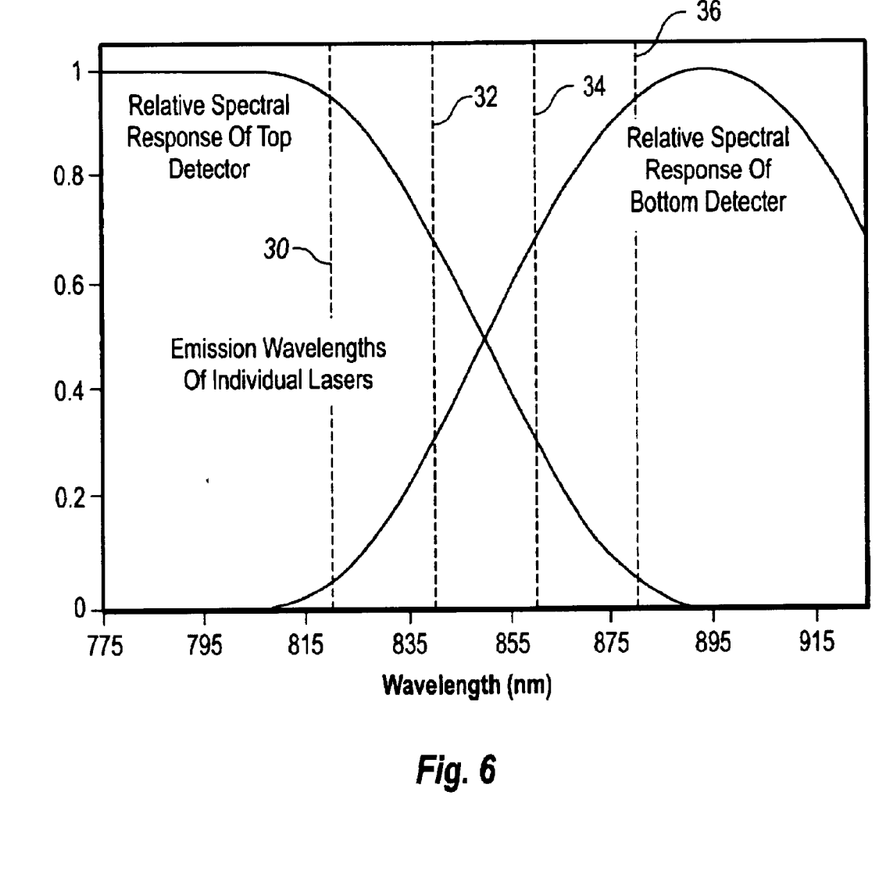
FIG. 6 is a graph showing cumulative relative spectral responses of the two photo-diodes of the detector shown in FIG. 2.

FIG. 6 is a graph showing cumulative relative spectral responses of the two photo-diodes (D1) and (D2) of the detector shown in FIG. 2. The optical output signals of optoelectronic emitters 10, 12, 14 and 16 of FIG. 1 are shown at 30, 32, 34 and 36, each having a different wavelength in this case.

As can be seen, the top photo-diode (D1) absorbs most of the first optical output signal 30, which has the shortest wavelength. Because most of the first optical output signal 30 is absorbed by the top photo-diode (D1), only a small fraction of the first optical output signal 30 is transmitted to the bottom photo-diode (D2). In the embodiment shown, the bottom photo-diode (D2) absorbs the remainder of the first optical output signal 30.

The top photo-diode (D1) also absorbs a majority of the second optical output signal 32. Because a majority of the second optical output signal 32 is absorbed by the top photo-diode (D1), only a minority of the second optical output signal 32 is transmitted to the bottom photo-diode (D2). In the embodiment shown, the bottom photo-diode (D2) absorbs the remainder of the second optical output signal 32.

The top photo-diode (D1) absorbs a minority of the third optical output signal 34. Because only a minority of the third optical output signal 34 is absorbed by the top photo-diode (D1), a majority of the third optical output signal 34 is transmitted to the bottom photo-diode (D2). In the embodiment shown, the bottom photo-diode (D2) absorbs the remainder of the third optical output signal 34.

Finally, the top photo-diode (D1) absorbs only a small fraction of the fourth optical output signal 36. Because only a small fraction of the fourth optical output signal 36 is absorbed by the top photo-diode (D1), most of the fourth optical output signal 36 is transmitted to the bottom photo-diode (D2). In the embodiment shown, the bottom photo-diode (D2) absorbs the remainder of the fourth optical output signal 36.

As can be seen, when the power of one of the optoelectronic emitters 10, 12, 14 and 16 changes, the relative portions absorbed by the first absorbing layer 62 of the top photo-diode (D1) and the second absorbing layer 66 of the bottom photo-diode (D2) may also change. For example, if the power level produced by the optoelectronic emitter 10 decreases by ten percent, the overall light absorbed by the first absorbing layer 62 of the top photo-diode (D1) may decrease more than the overall light absorbed by the second absorbing layer 22 of the bottom photo-diode (D2). In this example, this is because the first absorbing layer 62 of the top photo-diode (D1) absorbs more of the first optical output signal than the second absorbing layer 66 of the second photo-diode (D2). By using a measure of the light absorption in the first absorbing layer 62 of the first photo-diode (D1) and/or a measure of the light absorption in the second absorbing layer 66 of the second photo-diode (D2), an indication of the change in power level produced by one or more of the optoelectronic emitters 10, 12, 14 and 16 can be identified.

Figure 7:
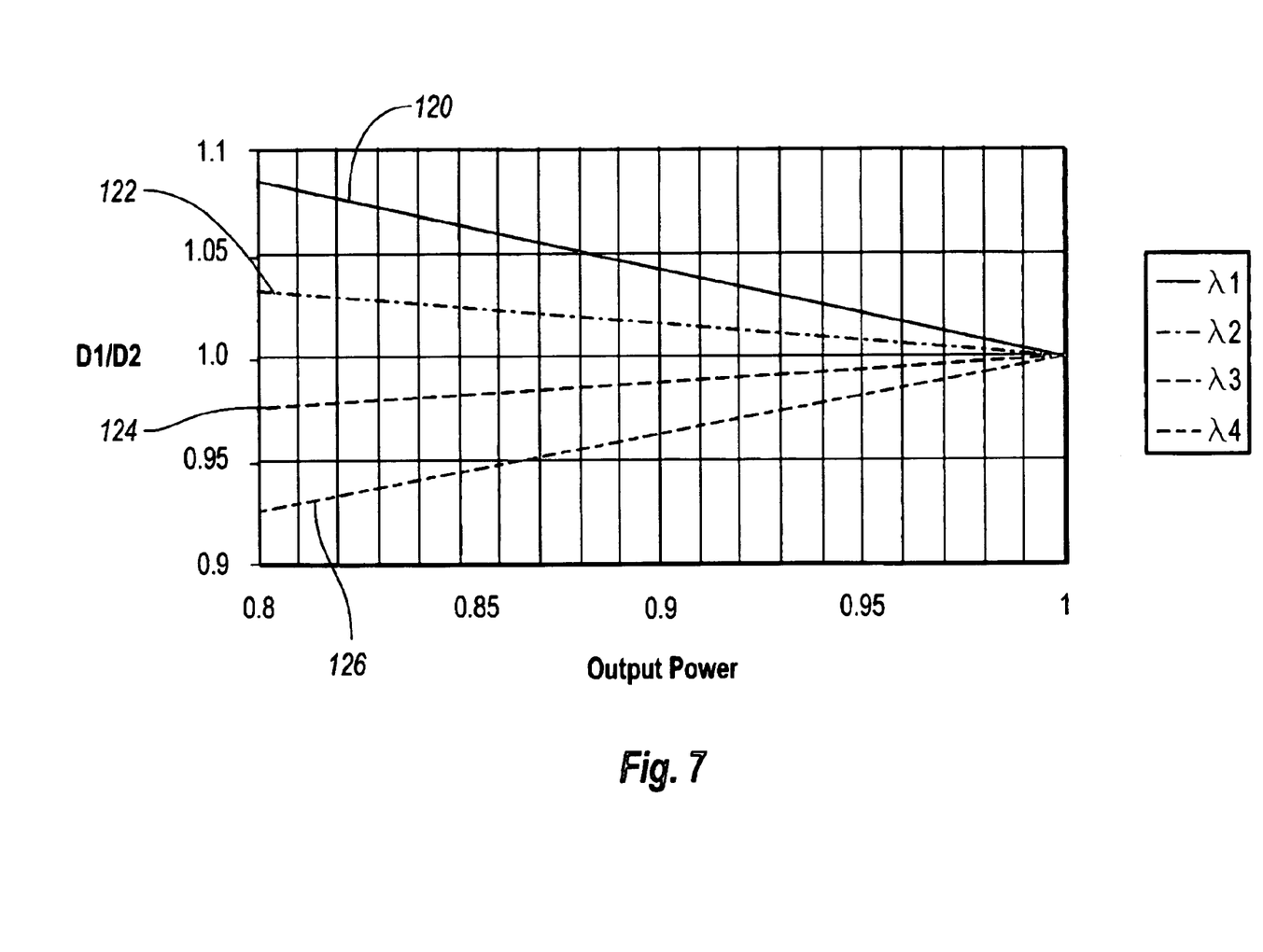
FIG. 7 is a graph showing a ratio of the output signal of a top diode relative to the output signal of a bottom diode versus output power of an incoming light beam.

FIG. 7 is a graph showing a ratio of the output signal 80 of the top photo-diode (D1) relative to the output signal 82 of the bottom photo-diode (D2) versus output power of an incoming light beam. The graph shown in FIG. 7 assumes, for example, that optoelectronic emitters 10, 12, 14, and 16 produce optical output signals 30, 32, 34 and 36, having wavelengths $\lambda_1$, $\lambda_2$, $\lambda_3$, and $\lambda_4$, respectively. The graph shown in FIG. 7 also assumes that the spectral response of the top detector (D1) is such that it absorbs 10%, 30%, 70% and 90% of wavelengths $\lambda_1$, $\lambda_2$, $\lambda_3$, and $\lambda_4$, respectively, and that the spectral response of the bottom detector (D2) is such that it absorbs 90%, 70%, 30% and 10% of the wavelengths $\lambda_1$, $\lambda_2$, $\lambda_3$, and $\lambda_4$, respectively. For illustration purposes, FIG. 7 also assumes that all four optoelectronic emitters 10, 12, 14, and 16 initially produce an output power of 1.0 unit.

If one of the optoelectronic emitters 10, 12, 14, and 16 begins to degrade or produce a change in output power, the ratio of the output signals 80 to 82 from detectors D1 and D2 may also change. In addition, the overall magnitude (e.g.

sum) of the output signals 80 and 82 from detectors D1 and D2 may change. Referring specifically to FIG. 7, degradation curves 120, 122, 124 and 126 are shown for optoelectronic emitter 10, 12, 14, and 16, respectively. Thus, if a signal ratio (D1/D2) of 1.05 is detected, it can be concluded that optoelectronic emitter 10, which corresponds to $\lambda_2$, has degraded to about 0.88% of full power. Controller 50 may detect this change and increase the current and/or voltage that is provided to optoelectronic emitter 10 to correct for the detected power degradation.

In another example, if a signal ratio (D1/D2) of 1.025 is detected, either optoelectronic emitter 10 (which corresponds to $\lambda_1$) has degraded sufficiently to cause the detected output power to fall to about 0.94% of full power, or optoelectronic emitter 12 (which corresponds to $\lambda_2$) has degraded sufficiently to cause the detected output power to fall to about 0.88% of full power. In this case, an overall magnitude (e.g. sum) of the signals 80 and 82 from detectors D1 and D2 can be used to determine which of the optoelectronic emitters has actually degraded. For example, if the overall magnitude (e.g. sum) of the signals 80 and 82 from detectors D1 and D2 only degraded by a small amount (e.g. about 1.5%), it can be concluded that optoelectronic emitter 10 (which corresponds to $\lambda_1$) has degraded. If, on the other hand, the overall magnitude (e.g. sum) of the signals 80 and 82 from detectors D1 and D2 has degraded by a larger amount (e.g. about 3%), then it can be concluded that optoelectronic emitter 12 (which corresponds to $\lambda_2$) has degraded.

It is contemplated that curves 120, 122, 124 and 126 may be dependent on operating temperature, time and/or any other parameter of interest, if desired. While a signal ratio is described above, other functions may also be used including, for example, sum and/or difference signals, or any other function, as desired.

When the power output from all optoelectronic emitters change simultaneously, as might result from a change in operating temperature, voltage, etc., the signal ratio (D1/D2) may remain substantially constant. However, the overall magnitude (e.g. sum) of the signals 80 and 82 from detectors D1 and D2 may change. In this case, the controller may increase the current and/or voltage that is provided to all optoelectronic emitter 10, 12, 14, and 16 to correct for the overall power degradation.

Figure 8:
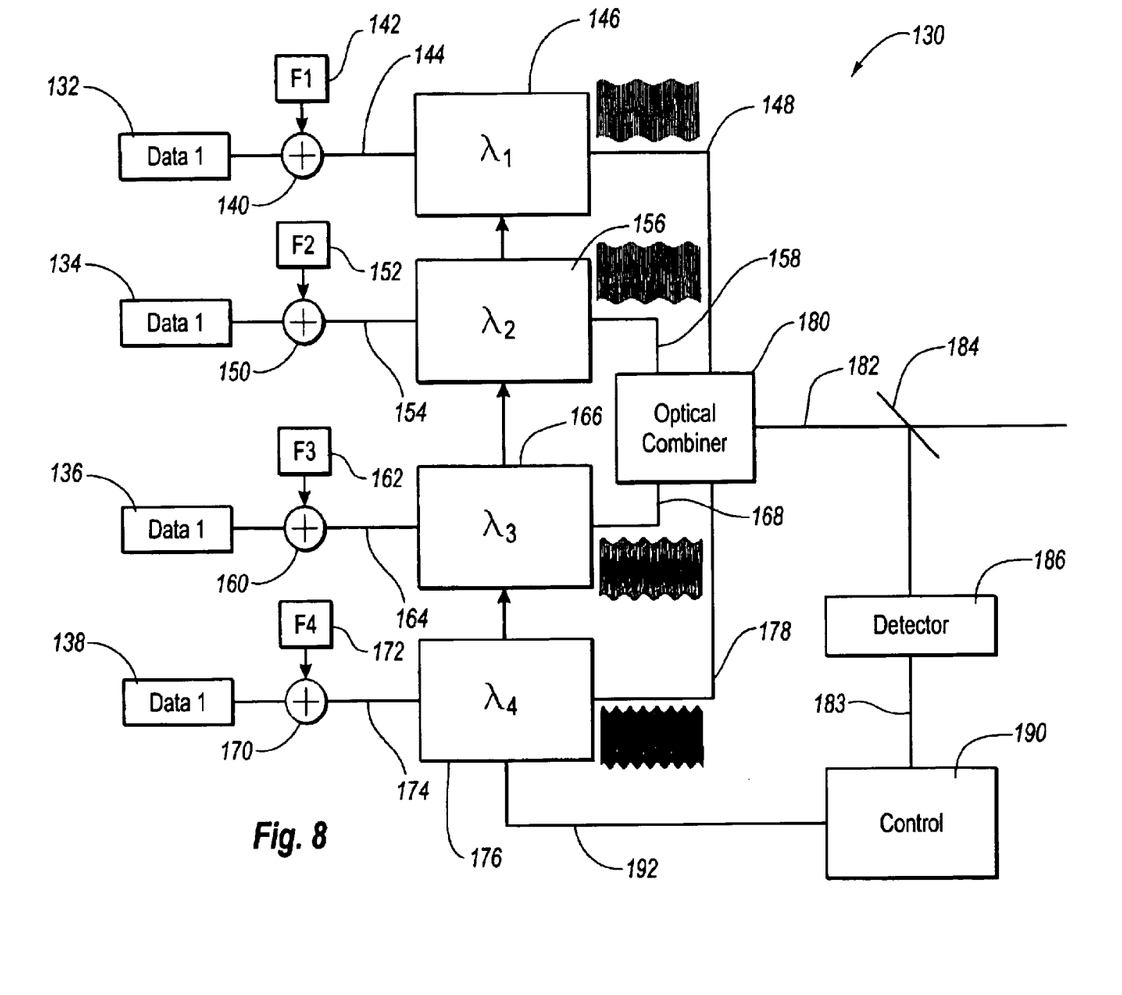
FIG. 8 is a schematic diagram of another illustrative optical transmitter system in accordance with the present invention.

Another illustrative embodiment of the present invention is shown in FIG. 8. FIG. 8 shows an optical transmitter 130 that includes a first electrical input signal 132, a second electrical input signal 134, a third electrical input signal 136 and a fourth electrical input signal 138. For WDM and other applications, each of the electrical input signals 132, 134, 136 and 138 may have a different wavelength, such as wavelengths $\lambda_1$, $\lambda_2$, $\lambda_3$, and $\lambda_4$, respectively.

A first modulator 140 may be provided to modulate the first electrical input signal 132 with a first electrical power monitor signal 142 to produce a first electrical modulated signal 144. The first electrical modulated signal 144 may be provided to a first optoelectronic emitter 146 to produce a first optical output signal 148. The first electrical power monitor signal 142 may operate at a frequency that is substantially less than the frequency or data rate of the first electrical input signal 132 so that the first electrical power monitor signal 142 may be used to determine an average power output produced by the first optoelectronic emitter 146. In some embodiments, the first modulator 140 may amplitude modulate the first electrical input signal 132 with the first electrical power monitor signal 142, with the amplitude of the first electrical power monitor signal 142 substantially less than the amplitude of the first electrical input signal 132.

A second modulator 150 may also be provided to modulate the second electrical input signal 134 with a second electrical power monitor signal 152 to produce a second electrical modulated signal 154. The second electrical modulated signal 154 may be provided to a second optoelectronic emitter 156 to produce a second optical output signal 158. The second electrical power monitor signal 152 may operate at a frequency that is substantially less than the frequency or data rate of the second electrical input signal 134 so that the second electrical power monitor signal 152 may be used to determine an average power output produced by the second optoelectronic emitter 156. In some embodiments, the second modulator 150 may amplitude modulate the second electrical input signal 134 with the second electrical power monitor signal 152, with the amplitude of the second electrical power monitor signal 152 substantially less than the amplitude of the second electrical input signal 134.

A third modulator 160 may also be provided to modulate the third electrical input signal 136 with a third electrical power monitor signal 162 to produce a third electrical modulated signal 164. The third electrical modulated signal 164 may be provided to a third optoelectronic emitter 166 to produce a third optical output signal 168. The third electrical power monitor signal 162 may operate at a frequency that is substantially less than the frequency or data rate of the third electrical input signal 136 so that the third electrical power monitor signal 162 may be used to determine an average power output produced by the third optoelectronic emitter 166. In some embodiments, the third modulator 160 may amplitude modulate the third electrical input signal 136 with the third electrical power monitor signal 162, with the amplitude of the third electrical power monitor signal 162 substantially less than the amplitude of the third electrical input signal 136.

A fourth modulator 170 may also be provided to modulate the fourth electrical input signal 138 with a fourth electrical power monitor signal 172 to produce a fourth electrical modulated signal 174. The fourth electrical modulated signal 174 may be provided to a fourth optoelectronic emitter 176 to produce a fourth optical output signal 178. The fourth electrical power monitor signal 172 may operate at a frequency that is substantially less than the frequency or data rate of the fourth electrical input signal 138 so that the fourth electrical power monitor signal 172 may be used to determine an average power output produced by the fourth optoelectronic emitter 176. In some embodiments, the fourth modulator 170 may amplitude modulate the fourth electrical input signal 138 with the fourth electrical power monitor signal 172, with the amplitude of the fourth electrical power monitor signal 172 substantially less than the amplitude of the fourth electrical input signal 138.

An optical combiner 180 may be used to combine the first optical output signal 148, the second optical output signal 158, the third optical output signal 168, and the fourth optical output signal 178 into a common optical output beam 182. A partially reflective plate 184 may be used to direct at least part of the common optical output beam 182 to a detector 186. The detector 186 may produce one or more electrical detection signals 183 that are provided to a controller 190, as shown.

In some embodiments, the detector 186 is a wide band detector, and the frequency of the first electrical power monitor signal 142, the second electrical power monitor signal 152, the third electrical power monitor signal 162, and the fourth electrical power monitor signal 172 are different. Once receiving the electrical detection signal(s) from the detector 186, the controller 190 may frequency separate the first power monitor signal 142, the second power monitor signal 152, the third power monitor signal 162 and the fourth power monitor signal 172 from the electrical detection signal provided by the detector 186. This may result in a first, a second, a third and a fourth detected power monitor signal. Based on selected characteristics of each of the first, second, third and fourth detected power monitor signals, the controller 190 may adjust the current and/or voltage that is applied to the first, second, third and/or fourth optoelectronic emitters 146, 156, 166 and 176 via interface 192.

For example, and in one illustrative embodiment, the controller 190 may adjust the current and/or voltage applied to the first, second, third and/or fourth optoelectronic emitters 146, 156, 166 and 176 based on the amplitude of the first, second, third and fourth detected power monitor signals. Harmonic distortions of the first, second, third and fourth detected power monitor signals may also be used as a relative threshold determination, if desired. While four wavelengths of light are used in this example, it is contemplated that any number of wavelengths of light may be used.

Figure 9:
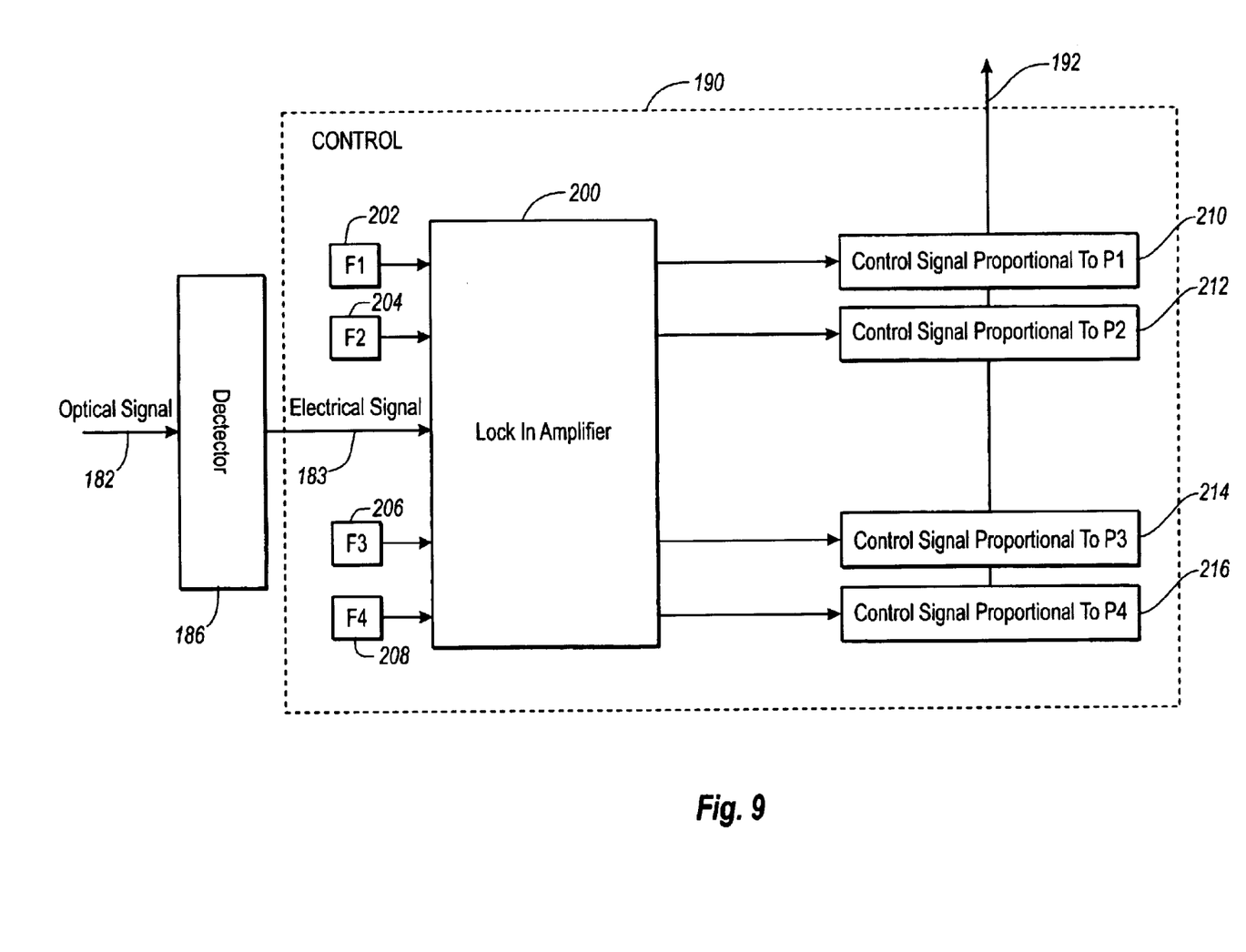
FIG. 9 is a schematic diagram of an illustrative control block for use with the optical transmitter system of FIG. 8.

FIG. 9 is a schematic diagram of an illustrative control block 190 for use with the optical transmitter system of FIG. 8. The illustrative control block 190 receives an electrical detection signal 183 from the detector 186, and provides the electrical detection signal 183 to a lock-in amplifier 200. The lock-in amplifiers receive four lock-in frequencies 202, 204, 206 and 208. Each of the four lock-in frequencies 202, 204, 206 and 208 may match the frequency of the first, second, third and fourth power monitor signals 142, 152, 162 and 172, respectively. Using the four lock-in frequencies 202, 204, 206 and 208, the lock-in amplifier 200 frequency separates the first, second, third and fourth detected power monitor signals from the electrical detection signal 183 provided by the detector 186. From this, the lock-in amplifiers 200 provide control signals 210, 212, 214 and 216 that are proportional to the power (e.g. amplitude) of the first, second, third and fourth detected power monitor signals, respectively. These control signals may be provided to the first, second, third and fourth optoelectronic emitters 146, 156, 166 and 176, respectively, via interface 192, to control the power of each of the optoelectronic emitters. Rather than using a lock-in amplifier 200, it is contemplated that one or more filters, including passive filters or the like, may be used to frequency separate the first, second, third and fourth detected power monitor signals from the electrical detection signal 183.

Rather than using a broad band detector 186, it is contemplated that the optical transmitter 130 may include a detector similar to that described above with respect to FIG. 2 to provide an indication of the power level of selected wavelengths of light in the common optical output beam 182. For example, if four electrical input signals 132, 134, 136 and 138 are provided, two of the electrical input signals 132 and 136 may be modulated using a first electrical power monitor signal and the remaining two electrical input signals 134 and 138 may be modulated using a second electrical power monitor signal. The first electrical power monitor signal may be at a different frequency than the second electrical power monitor signal. The four modulated electrical input signals may then be provided to the optoelectronic emitters 146, 156, 166 and 176 to produce four optical output signals. Like above, an optical combiner may be used to combine the four optical output signals into a common optical output beam.

The detector may include, for example, a first absorbing layer, a second absorbing layer situated below the first absorbing layer, and an intermediate layer positioned between the first absorbing layer and the second absorbing layer. The first absorbing layer may absorb a different proportion of the each of the four optical output signals, and the second absorbing layer may absorb the remaining portion of each of the four optical output signals. When the power of any of the four optical output signals changes, the relative portions absorbed by the first absorbing layer and the second absorbing layer may also change. For example, if the power level of a first wavelength of light produced by the first optoelectronic emitter 146 decreases by ten percent, the overall light absorbed by the first absorbing layer may decrease more than the overall light absorbed by the second absorbing layer, particularly if the first absorbing layer absorbs more of the first wavelength of light.

After the common optical output signal is detected by the detector, the electrical power monitor signals may be frequency separated from the detected signals by, for example, using lock-in amplifiers, band-pass filters, or any other method as desired. The first electrical power monitor signal, which was modulated and provided to optoelectronic emitters 146 and 166, may be used to determine if the average power from optoelectronic emitter 146 and/or optoelectronic emitter 166 has changed, and by what amount. Likewise, the second electrical power monitor signal, which was modulated and provided to optoelectronic emitters 156 and 176, may be used to determine if the average power from optoelectronic emitters 156 and/or 176 has changed, and by what amount. Thus, if one of the optoelectronic emitters experiences a change in output power, the first electrical power monitor signal and the second electrical power monitor signal may be used to identify which optoelectronic emitter pair (146/166 or 156/176) includes the optoelectronic emitter that produced the change in output power.

To identify which optoelectronic emitter in the identified pair actually produced the change in output power, a ratio D1/D2 of the detector output signals may be used. For example, and referring to the FIG. 7, if a signal ratio (D1/D2) of 1.025 is detected, either optoelectronic emitter 146 (which corresponds to $\lambda_1$) has degraded sufficiently to cause the detected output power to fall to about 0.94% of full power, or optoelectronic emitter 156 (which corresponds to $\lambda_2$) has degraded sufficiently to cause the detected output power to fall to about 0.88% of full power. However, if it is already known from examining the first electrical power monitor signal and the second electrical power monitor signal that the optoelectronic emitter pair 146/166 produced the change in output power, it can be concluded that optoelectronic emitter 146 must have degraded. Thus, and as can be seen, a measure of the light absorption in the first absorbing layer and a measure of the light absorption in the second absorbing layer can be used to help provide an indication of the change in the power level of selected ones of the optoelectronic emitters. Once identified, a controller or the like can be used to adjust the voltage and/or current that is provided to the identified optoelectronic emitter.

Having thus described the preferred embodiments of the present invention, those of skill in the art will readily appreciate that the teachings found herein may be applied to yet other embodiments within the scope of the claims hereto attached.

What is claimed is:

1. A detector for detecting a light beam having a first wavelength of light and a second wavelength of light, and for providing an indication of a change in power in the first wavelength of light and/or the second wavelength of light, the detector comprising a first absorbing layer for absorbing a first portion of the first wavelength of light and a second portion of the second wavelength of light, the first absorbing layer having a first conductivity type;

a second absorbing layer situated below the first absorbing layer for absorbing a third portion of the second wavelength of light and a fourth portion of the first wavelength of light, the second absorbing layer having the first conductivity type;

an intermediate layer situated between the first absorbing layer and the second absorbing layer, the intermediate layer having a second conductivity type; and providing means for providing an indication of a change in power in the first wavelength of light and/or the second wavelength of light using a measure of the light absorption in the first absorbing layer and a measure of the light absorption in the second absorbing layer.

2. A detector according to claim 1 wherein the first portion is a majority of the first wavelength of light, the second portion is a minority of the second wavelength of light.

3. A detector according to claim 2 wherein the third portion is a majority of the second wavelength of light, and the fourth portion is a minority of the first wavelength of light.

4. A detector according to claim 1 wherein the first absorbing layer has a higher bandgap than the second absorbing layer.

5. A detector according to claim 4 wherein the first absorbing layer is AlGaAs and the second absorbing layer is GaAs.

6. A detector according to claim 4 wherein the intermediate layer has a higher bandgap than the second absorbing layer.

7. A detector according to claim 1 wherein the first absorbing layer and the second absorbing layer each have a layer thickness, and wherein the layer thickness of the first absorbing layer is less than the layer thickness of the second absorbing layer.

8. A detector according to claim 1 wherein the first absorbing layer and the second absorbing layer each have a layer thickness, wherein the layer thickness of the first absorbing layer is set so that the first absorbing layer absorbs a majority of the first wavelength of light and passes a minority of the first wavelength of light, and the layer thickness of the second absorbing layer is set so that the second absorbing layer absorbs a majority of the second wavelength of light.

9. A detector according to claim 1 wherein the first absorbing layer has the same bandgap as the second absorbing layer.

10. A detector according to claim 9 wherein the first absorbing layer and the second absorbing layer are silicon.

11. A detector according to claim 10 wherein the first absorbing layer and the second absorbing layer each have a layer thickness, and wherein the layer thickness of the first absorbing layer is less than the layer thickness of the second absorbing layer.

12. A detector according to claim 10 wherein the first absorbing layer and the second absorbing layer each have a layer thickness, wherein the layer thickness of the first absorbing layer is set so that the first absorbing layer absorbs a majority of the first wavelength of light and passes a minority of the first wavelength of light, and the layer thickness of the second absorbing layer is set so that the second absorbing layer absorbs a majority of the second wavelength of light.

13. A detector according to claim 1 wherein the first absorbing layer and the second absorbing layer each generate one or more carriers when absorbing light, the intermediate layer being positioned directly adjacent to the first absorbing layer to form a first PN junction that collects the one or more carriers generated in the first absorbing layer.

14. A detector according to claim 13 wherein the intermediate layer is positioned directly adjacent the second absorbing layer to form a second PN junction that collects the one or more carriers generated in the second absorbing layer.

15. A detector according to claim 14 wherein the first PN junction produces a first output signal and the second PN junction produces a second output signal, the providing means using a ratio of the first output signal and the second output signal to provide an indication of a change in power in the first wavelength of light and/or the second wavelength of light.

16. A detector according to claim 15 wherein the providing means uses the ratio of the first output signal and the second output signal as well as a sum of the first output signal and the second output signal to provide an indication of a change in power in the first wavelength of light and/or the second wavelength of light.

17. A detector according to claim 1 wherein the first wavelength of light is produced by a first optoelectronic emitter and the second wavelength of light is produced by a second optoelectronic emitter.

18. A detector for detecting a light beam having two or more wavelengths of light, and for providing an indication of a change in power in at least one or the two or more wavelengths of light, the detector comprising a first absorbing layer for absorbing a different portion of each of the two or more wavelengths of light;

a second absorbing layer situated below the first absorbing layer for absorbing substantially a remaining portion of each of the two or more wavelengths of light; and providing means for providing an indication of a change in power in at least one of the two or more wavelengths of light using a measure of the light absorption in the first absorbing layer and a measure of the light absorption in the second absorbing layer.

19. A method for detecting a light beam having two or more wavelengths of light, and for providing an indication of a change in power in at least one of the two or more wavelengths of light, the method comprising absorbing a different portion of each of the two or more wavelengths of light in a first absorbing layer;

absorbing substantially a remaining portion of each of the two or more wavelengths of light in a second absorbing layer; and providing an indication of a change in power in at least one of the two or more wavelengths of light using a measure of the light absorption in the first absorbing layer and a measure of the light absorption in the second absorbing layer.

20. A system, comprising:

two or more optoelectronic emitters for collectively producing a light beam having two or more different wavelengths of light;

a detector for receiving the light beam, the detector having a first absorbing layer for absorbing a first portion of the first wavelength of light and a second portion of the second wavelength of light, and a second absorbing layer situated below the first absorbing layer for absorbing a third portion of the second wavelength of light and a fourth portion of the first wavelength of light; and providing means for providing an indication of a change in power in the first wavelength of light and/or the second wavelength of light using a measure of the light absorption in the first absorbing layer and a measure of the light absorption in the second absorbing layer.

21. A system according to claim 20 wherein the first portion is a majority of the first wavelength of light, and, the second portion is a minority of the second wavelength of light.

22. A system according to claim 21 wherein the third portion is a majority of the second wavelength of light, and the fourth portion is a minority of the first wavelength of light.

23. A system according to claim 20 wherein said providing means uses a ratio of the measure of the light absorption in the first absorbing layer and the measure of the light absorption in the second absorbing layer.

24. A system according to claim 23 wherein said providing means further uses a sum of the measure of the light absorption in the first absorbing layer and the measure of the light absorption in the second absorbing layer.

25. An optoelectronic transmitter for receiving a first and a second electrical input signal and for transmitting a corresponding first and second optical output signal in a common light beam, the first and the second optical output signals having different wavelengths, the optoelectronic transmitter comprising:

a first modulator for modulating the first electrical input signal with a first electrical power monitor signal to produce a first electrical modulated signal, the first electrical input signal operating at a first frequency, and the first electrical power monitor signal operating at a frequency that is less than the first frequency;

a second modulator for modulating the second electrical input signal with a second electrical power monitor signal to produce a second electrical modulated signal, the second electrical input signal operating at a second frequency, and the second electrical power monitor signal operating at a frequency that is less than the second frequency;

a first optoelectronic emitter for receiving the first electrical modulated signal and for transmitting a corresponding first optical output signal;

a second optoelectronic emitter for receiving the second electrical modulated signal and for transmitting a corresponding second optical output signal;

an optical combiner for combining the first optical output signal and the second optical output signal into the common light beam;

an optoelectronic detector for monitoring the common light beam and for producing a corresponding electrical detection signal;

means for separating out the first power monitor signal and the second power monitor signal from the electrical detection signal, resulting in a first detected power monitor signal and a second detected power monitor signal; and means for adjusting the power of the first optoelectronic emitter and the second optoelectronic emitter based on one or more characteristics of the first detected power monitor signal and the second detected power monitor signal.

26. An optoelectronic transmitter according to claim 25 wherein the frequency of the first electrical power monitor signal is substantially less than the first frequency of the first electrical input signal, and the frequency of the second electrical power monitor signal is substantially less than the second frequency of the second electrical input signal.

27. An optoelectronic transmitter according to claim 26 wherein the frequency of the first electrical power monitor signal is different from the frequency of the second electrical power monitor signal.

28. An optoelectronic transmitter according to claim 25 wherein the first electrical input signal and the first electrical power monitor signal each have an amplitude, and wherein the amplitude of the first electrical power monitor signal is less than the amplitude of the first electrical input signal.

29. An optoelectronic transmitter according to claim 28 wherein the second electrical input signal and the second electrical power monitor signal each have an amplitude, and wherein the amplitude of the second electrical power monitor signal is less than the amplitude of the second electrical input signal.

30. An optoelectronic transmitter according to claim 25 wherein the optoelectronic detector is a wide band detector capable of detecting the first optical output signal and the second optical output signal.

31. An optoelectronic transmitter according to claim 25 wherein the first modulator amplitude modulates the first electrical input signal with the first electrical power monitor signal to produce a first electrical amplitude modulated signal, and the second modulator amplitude modulates the second electrical input signal with the second electrical power monitor signal to produce a second electrical amplitude modulated signal.

32. An optoelectronic transmitter according to claim 25 further comprising:

a third electrical input signal and a fourth electrical input signal;

the first modulator modulating the third electrical input signal with the first electrical power monitor signal to produce a third electrical modulated signal, the third electrical input signal operating at a third frequency, and the first electrical power monitor signal operating at a frequency that is less than the third frequency;

the second modulator modulating the fourth electrical input signal with the second electrical power monitor signal to produce a fourth electrical modulated signal, the fourth electrical input signal operating at a fourth frequency, and the second electrical power monitor signal operating at a frequency that is less than the fourth frequency;

a third optoelectronic emitter for receiving the third electrical modulated signal and for transmitting a corresponding third optical signal;

a fourth optoelectronic emitter for receiving the fourth electrical modulated signal and for transmitting a corresponding fourth optical signal; and the optical combiner combining the first optical signal, the second optical signal, the third optical signal and the fourth optical signal into a common light beam.

33. An optoelectronic transmitter according to claim 32 wherein the optoelectronic detector includes:

a first absorbing layer for absorbing a different portion of each of the first, second, third and fourth optical signals;

a second absorbing layer situated below the first absorbing layer for absorbing substantially a remaining portion of each of the first, second, third and fourth optical signals;

processing means for determining whether the first optical signal or the fourth optical signal had an increase or decrease in power level, or whether the second optical signal or third optical had an increase or decrease in power level, using a measure of the light absorption in the first absorbing layer and a measure of the light absorption in the second absorbing layer.

34. An optoelectronic transmitter according to claim 33 wherein:

said separating means separates out the first power monitor signal from the first optical signal and the third optical signal and the second power monitor signal from the second optical signal and the fourth optical signal; and said adjusting means adjusting the power of the first optoelectronic emitter if the processing means determines that the first optical signal or fourth optical signal had an increase or decrease in power level and said first power monitor signal indicates that said first optical signal or third optical signal had an increase or decrease in power level;

said adjusting means adjusting the power of the second optoelectronic emitter if the processing means determines that the second optical signal or third optical signal had an increase or decrease in power level and said second power monitor signal indicates that said second optical signal or fourth optical signal had an increase or decrease in power level;

said adjusting means adjusting the power of the third optoelectronic emitter if the processing means determines that the second optical signal or third optical signal had an increase or decrease in power level and said first power monitor signal indicates that said first optical signal or third optical signal had an increase or decrease in power level; and said adjusting means adjusting the power of the fourth optoelectronic emitter if the processing means determines that the first optical signal or fourth optical signal had an increase or decrease in power level and said second power monitor signal indicates that said second optical signal or fourth optical signal had an increase or decrease in power level.

* * * * *